United States Patent Office 3,366,505

Patented Jan. 30, 1968

3,366,505

MANUFACTURE OF MAGNETIC RECORDING MATERIAL WITH MORE DURABLE SURFACE STRATUM ON RECORDING LAYER

Johan Heinrich Bisschops, Berchem Antwerp, and Willy Karel Van Landeghem, Sint Gillis Waas, Belgium, assignors to Gevaert Photo-Producten N.V., Mortsel, Belgium, a Belgian company No Drawing. Filed June 24, 1964, Ser. No. 377,508

Claims priority, application Netherlands, June 27, 1963, 294,678

12 Claims. (Cl. 117—62.2)

ABSTRACT OF THE DISCLOSURE

A process of making recording tape in which the magnetic particles are coated on the tape dispersed in a solvent solution of a polymeric binding agent containing a reactive hydroxy or amido group and a cross-linking agent for the polymer, the coating is dried, and a liquid containing a catalyst for the cross-linking reaction is applied to the surface of the dried coating. The purpose is to achieve cross-linking preferentially at the surface to give a more durable surface layer. The cross-linking agent is an aldehyde, an aldehyde-releasing compound, or a polyisocyanate.

The invention pertains to a process for the manufacture of magnetic recording material and to magnetic recording material, which is manufactured by application of this process. More particularly this invention relates to the manufacture of flexible magnetizable recording layers showing high wear resistance.

The common magnetizable recording materials consist of a support and a magnetizable recording layer containing a magnetizable powder, which is dispersed in an organic binder. For the manufacture of such magnetizable recording layer it is known to disperse the magnetizable powder in a solution of a synthetic resin such as particular cellulose derivatives, vinyl polymers e.g. polyvinyl chloride, copolymers of acrylonitrile, epoxy resins, urea formaldehyde resins and resins prepared by reaction of polyhydroxy compounds with polyisocyanates.

The mechanical requirements as to the magnetizable recording layers become stricter according to their use for sound recording, recording of digital information or video recording. Especially the so-called instrumentation tape and video recording tape should manifest a very high wear resistance. The magnetizable powder should therefore be strongly anchored in the binder, such that the formation of dust and the loss of magnetizable particles by mechanical friction remain the lowest possible.

The wear resistance of the magnetic layer was found to be improved by the utilization of a polymeric binder with steric structure. Various processes are known for preparing a magnetic recording layer with the help of a binder with steric structure, e.g. by curing of epoxy resins such as described in the French patent specification 1,132,409, or by reaction "in situ" of polyisocyanates with polyhydroxy compounds such as described in the German patent specification 814,225, or by thermosetting of phenol formaldehyde resins such as described in the United Kingdom patent specification 847,347.

It is further known that polymeric binders with cross-linked molecule chains or steric structure can be obtained by polycondensation of phenols, urea or melamine with formaldehyde or another aldehyde suited for this purpose, this polycondensation being catalyzed with acid.

More particularly a process for the manufacture of magnetizable recording layers on a rigid support is known from the German patent application 1,092,224. In this process use is made as a binder for the magnetizable material of a melamine formaldehyde resin etherified with butanol and polyvinyl acetate in a proportion of 1:1 to 1:3. According to this process in order to cure the melamine resin in cold condition, phosphoric acid is added to the dispersion of the magnetizable particles in the dissolved resin prior to coating.

Owing to their rigidity and brittleness recording layers obtained according to this method are suited only for covering a rigid support.

Although the recording layers manufactured according to the above-mentioned process do possess an enhanced wear resistance, they show the disadvantage of causing considerable wear of the record head and reproduce head owing to the protrusion of the magnetizable particles from the binder. Such recording layers comprising magnetizable particles, which partially protrude from the surface, are characterized by a mat appearance.

After the curing of the binder mechanical methods such as calendering do not remedy to these disadvantages because the recording layer has lost its plasticity owing to the curing.

The covering of the magnetizable layer with a protective layer consisting of pure synthetic resin prevents the loss of actual material. Nevertheless the recording layers provided with such protective layer show the disadvantage that the reproduction of signals with short wavelength is strongly impaired by the enhanced distance of the record and reproduce head to the magnetizable layer. Consequently record layers with a protective layer are not suited for recording information with high signal density.

The present invention is concerned with the manufacture of flexible recording layers, which are most appropriate for recording of high-frequency signals (information with high signal density), and which display an enhanced wear resistance and a better bonding of the magnetizable material in the surface of the recording layer. This object is reached according to the invention by applying to a support a dispersion of magnetizable particles in a solution of a binder having molecules which can be sterically cross-linked under the influence of a catalyst, which after the application of the said dispersion and the evaporation of most of the solvent of the binder is applied from a liquid phase to the surface of the recording layer.

As a result of this technique, which at first sight does not manifest any material difference from a process according to which the catalyst is added to the dispersion of the magnetizable material in the dissolved binder, the recording layer is very strongly cured only at the surface and remains tenacious and flexible internally.

The surface of a recording layer obtained by application of the process according to the invention is found to be more resistant to wear, harder and smoother than that of a recording layer obtained according to the process by which a catalyst is added to the dispersion prior to its application to the support. This is probably due to the fact that during evaporation of the solvent from which the catalyst is applied, a little amount of the binder diffuses upwards to the surface of the recording layer and is concentrated there. Consequently a liquid, which to a more or less extent constitutes a solvent or swelling agent for the binder of the magnetizable powder is utilized preferably as a solvent for the catalyst. If the catalyst is applied in a high-boiling solvent with high dissolving power for the binder of the recording layer, the magnetizable powder at the surface becomes protected by a very thin cured layer of pure binder. The wear resistance, the hardness and the smoothness of the recording layer, however, are also greatly improved when dissolving the catalyst in low-boiling solvents or in weak swelling agents for the binder of the recording layer. Further, it should be noted that the treatment may occur also with a liquid catalyst in pure state.

According to the invention most differing polymer compositions curable with a catalyst can be utilized as a binder for the magnetizable powder.

This applies e.g. to a polymer composition consisting of macromolecules or containing macromolecules with hydroxyl groups, amide groups, or other groups with active hydrogen atoms rendering these binders curable e.g. with polyisocyanates and/or an aldehyde. The curing reaction by means of a polyisocyanate is accelerated by catalysts such as tertiary amines or tin (IV) chloride and other catalysts mentioned in the study of J. W. Britain and P. G. Gemeinhardt, Journal of Applied Polymer Science, vol. IV (1960) pp. 207–211. Binders comprising groups with active hydrogen atoms are stated i.a. in the French patent specification 1,347,399.

However, in the method of the present invention polymer binders which are curable under the influence of an acid catalyst with as curing agent an aldehyde such as formaldehyde or a substance forming an aldehyde, are preferred.

Known resins, which are curable with aldehydes such as formaldehyde under the influence of an acid are described in "Lackkunstharze" of Hans Wagner and Hans Friedrich Sarx (Carl Hanser Verlag, Munich, 1959). The commonly used polycondensation resins, however, of this type are the phenol formaldehyde resins and the amide and amine formaldehyde resins. Resols, which are curable in cold condition with an acid are described i.a. in the above-mentioned book of Wagner and Sarx on pages 48–49. Urea formaldehyde resins and melamine formaldehyde resins both curable with an acid are described in "Grundlagen der Anstrichwissenschaft" of A. V. Blom, pp. 141–143 (Verlag Birkhäuser, Basel, 1954).

As binding agents are used preferably high molecular weight compounds, which are polycondensation products comprising amine and/or amide groups, and/or urethane groups, and/or substituted urea groups, which are reactive with respect to formaldehyde, such as the polycondensates comprising in their structure amide groups as well as urethane groups and urea groups. Examples of such polycondensates are the polyester amides modified with organic diisocyanates described in the British patent specification 585,205 and the United States patent specifications 2,422,271 and 2,424,883. In the process according to the invention polyesters and polyester amides both modified with organic diisocyanates such as described i.a. in the British patent specification 580,524 are preferably employed. Those are elastomers, which under the influence of an acid catalyst, can easily be cross-linked with formaldehyde. The polyester amides, more particularly, are cured by reaction of formaldehyde with the active hydrogen atoms of the amide groups whereas the polyesters containing free hydroxyl groups are cured by reaction of formaldehyde with the active hydrogen atoms of the free hydroxyl groups.

In addition to the above-mentioned elastomers, plastomers, which either or not can be cross-linked by means of an aldehyde, can be used in the binder composition. Thermoplasts comprising free hydroxyl groups such as polyesters comprising hydroxyl groups, cellulose esters and cellulose ethers comprising hydroxyl groups as described i.a. in the British patent specification 585,205, polyvinyl acetals comprising hydroxyl groups such as polyvinyl formal, i.a. described in the British patent specification 585,083, and copolymers of vinyl alcohol and vinyl chloride are preferably utilized.

The proportion of elastomer to thermoplast chiefly determines the internal hardness of the magnetizable recording layer.

The proportion of binder to magnetic powder may vary from 10 to 40% by weight.

Appropriate aldehydes for the curing reaction catalyzed with acid are formaldehyde, soluble curing phenol formaldehyde resins, urea formaldehyde resins, or melamine formaldehyde resins, compounds splitting off formaldehyde such as paraformaldehyde, or compounds with methyol groups such as hexamethoxymethyl melamine. More particulars on this matter can be found in the British patent specification 580,524.

Other aldehydes as well, such as acetaldehyde, acrolein, benzaldehyde, and furfurol also offer the possibility of forming cured polycondensation products. Yet, they are found to be less reactive. The used amount of aldehyde depends on the amount of binder and on the desired hardness, but usually it ranges from 2 to 10% by weight.

In practice strong acids such as hydrochloric acid, phosphoric acid, monobutyl phosphate, polystyrene sulphonic acid, and p-toluene sulphonic acid are mainly utilized as a catalyst for the curing reaction with aldehyde. Yet, other substances, which actually react as an acid e.g. which form or split off an acid, can also be employed. Examples thereof are p-toluene sulphonyl chloride and dibenzyl sulphate mentioned respectively in the German patent specifications 596,409 and 642,767 and the acid anhydrides and acid-reacting salts mentioned in the British patent specification 580,524.

The concentration of the acid catalyst in the processing liquid preferably varies from 0.2 to 2%, calculated on the weight of the dry substance in the magnetizable recording layer.

The acid catalyst is applied preferably from a solvent having a high boiling point (preferably higher than 60° C.) and being a weak swelling agent for the binders used in the magnetizable dispersion. The solution of the acid catalyst is applied preferably to the nearly dry magnetizable dispersion layer according to a common coating system e.g., the kiss coating system.

After the evaporation of the solvent of the catalyst e.g. by heating, no acid is found in the magnetizable recording layer anymore since this very acid has reacted with the magnetizable material e.g. magnetizable metal oxides.

According to a preferred embodiment of the method of the invention for preparing a magnetizable recording material said method comprises the steps of applying to a support a dispersion of magnetically susceptible particles in a solvent solution of an aldehyde and a polymer curable by an aldehyde preferentially formaldehyde, and applying to the surface of the nearly dry dispersion layer an acid as curing catalyst dissolved in a solvent, which is a swelling agent for the said curable polymer. Appropriate dispersing agents for magnetizable metal oxides such as $\gamma$-$Fe_2O_3$ are described i.a. in the French patent specification 1,114,912. If the dispersing agent acts as an acid care should be taken that the amount, which is adsorbed by the magnetic powder, is not exceeded.

Suitable solvent for the above-mentioned binders are i.a. acetone, cyclohexanone, symmetric dichloroethane and methyl glycol acetate. An appropriate weak swelling agent for the above-mentioned binder is e.g. methanol.

In a preferred embodiment of the invention the curable high-molecular weight binder is a mixture of an elastomer and a thermoplast. As an elastomer are used preferably a polyester or polyester amide modified with organic polyisocyanates and are curable with formaldehyde under the influence of an acid catalyst. A polymer mixture offering optimal results is composed of 80 to 20% by weight of a polyester or polyester amide modified with polyisocyanate, and 20 to 80% by weight of a copolymer of vinyl chloride with one or more other vinyl monomers, the copolymer comprising 0.1 to 10% by weight of free hydroxyl groups. When using such binder composition the dispersion containing the magnetizable particles applied to a support preferably comprises from 1 to 20% by weight of formaldehyde or of a substance splitting off formaldehyde in respect of the total weight of curable compounds.

After the application of the magnetizable dispersion to a support e.g. a polyethylene terephthalate support occasionally covered with a subbing layer for the magnetizable layer (as described in the French patent specification 1,347,398) the solvent for the binder is nearly completely evaporated and the acid catalyst in a solvent preferably constituting a weak swelling agent for the binder is applied to the surface of the recording material.

The curing reaction under the influence of the acid catalyst already occurs at room temperature. After evaporation of most of the solvent and in order to accelerate the curing reaction, the temperature may be increased e.g. to 80–120° C.

Prior to the hardening i.e. before the treatment with the curing catalyst, the magnetizable recording layer can be calendered in order to enhance the packing density of the magnetizable powder.

The following examples illustrate the invention. The amounts mentioned in the examples are parts by weight.

*Example 1*

A mixture comprising the following ingredients is ground for 48 h. in a ball mill:

100 parts of needle-shaped $\gamma$-$Fe_2O_3$
2 parts of monobutyl phosphate
12.5 parts of a partially hydrolysed copoly(vinyl chloride/vinyl acetate) comprising 2.3% by weight of free hydroxyl groups and 3% by weight of vinyl acetate groups
200 parts of 1,2-dichloroethane The following products are added to this mixture:

10.5 parts of polyester amide modified with polyisocyanate resulting from the reaction of 5 parts of hexamethylene diisocyanate with 100 parts of a polyester amide, which is prepared by condensing 7.5 mole of ethylene glycol, 9 mole of adipic acid, and 1.5 mole of ethanolamine
2.5 parts of hexamethoxy methyl melamine
125 parts of 1,2-dichloroethane.

The grinding is continued for 24 h. and the resulting dispersion is filtered and deaerated. Subsequently the dispersion is applied to a polyethylene terephthalate support of 35$\mu$. During the coating by means of a doctor knife the thickness of the layer is adjusted such that upon drying the layer measures 10$\mu$.

The dispersion layer is dried for 2 min. at 80° C. The binder of the dispersion layer is soluble in 1,2-dichloroethane even after the drying of this layer.

To the dry dispersion layer are applied according to the kiss coating system per sq. m. 10 ccs. of a 2% solution of p-toluene sulfonic acid in methanol.

After drying at 80° C. for 1 min., the magnetizable recording layer is found to be insolubilized and strongly cured at the surface.

The reproduction of a recorded signal of 10 kHz. at a tape speed of 10 cm./min. is very faithful. The resulting tape can be used in a computer for a time twice as long as a tape comprising a recording layer prepared according to a process in which the catalyst is added to the dispersion prior to its coating on the support before the first "drop outs" are detected.

*Example 2*

In Example 1 the hexamethoxy methyl melamine is replaced as a curing agent by a formaldehyde resin etherified with butanol, marketed under the registered trade name Synresene PF 250 by N.V. Chemische Industrie Synres, Hoek van Holland, Netherlands. The quality of the tape is equivalent to that of the tape manufactured according to Example 1.

*Example 3*

In Example 1 the polyvinyl chloride is replaced by polyvinyl formal comprising 3% by weight of hydroxy groups.

The quality of the tape is analogous to that of the tape prepared according to Example 1.

*Example 4*

In Example 1 the polyvinyl chloride is replaced by cellulose acetobutyrate, which is esterified up to 41% with acetic acid and up to 22% with butyric acid.

The quality of the tape is similar to that of the tape manufactured according to Example 1.

*Example 5*

The modified polyester amide mentioned in Example 1 is replaced by a modified polyester resin prepared by reaction of 7.2 parts of 2,4-toluene diisocyanate with 100 parts of a polyester of adipic acid and ethylene glycol, the polyester comprising 1.4% of free hydroxyl groups.

*Example 6*

Example 1 is repeated with the proviso, however, that the acid catalyst is dissolved in butyl acetate in the given concentration.

The magnetizable recording layer has a fine gloss due to the formation of an extremely thin protective layer of cured pure binder.

*Example 7*

A mixture of the following ingredients is ground for 48 h. in a ball mill:

100 parts of needle-shaped $\gamma$-$Fe_2O_3$
2 parts of monobutyl phosphate
12.5 parts of a partially hydroylsed copoly(vinyl chloride/vinyl acetate) comprising 2.3% by weight of free hydroxyl groups and 3% by weight of vinyl acetate groups
200 parts of 1,2-dichloroethane.

Subsequently the following products are added to this mixture:

8 parts of the modified polyester amide described in Example 1
110 parts of 1,2-dichloroethane.

The grinding is continued for 24 h. and 5 parts of a polyurethane prepared from 1 mole of trimethylol propane and 3 mole of 2,4-toluene diisocyanate are added to the ground mixture.

After mixing for 2 h. the dispersion is filtered, deaerated and applied to a polyethylene terephthalate support of 35$\mu$.

The magnetizable recording layer is dried for 2 min. at 80° C.

The binder is found to be soluble yet in 1,2-dichloroethane.

On the dried recording layer are applied according to the kiss coating system 8 ccs. of a 2% solution of triethylamine in butanone per sq. m. of the recording layer.

After drying for 1 min. at 80° C. the recording layer is found to be cured, insoluble, and very resistant to wear.

*Example 8*

A mixture of the following ingredients is ground for 48 h. in a ball mill:

100 parts of needle-shaped $\gamma$-$Fe_2O_3$
2 parts of monobutyl phosphate
12.5 parts of a partially hydroylsed copoly(vinyl chloride/vinyl acetate) comprising 2.3% by weight of free hydroxyl groups and 3% by weight of vinyl acetate groups
200 parts of 1,2-dichloroethane.

The following products are added next to the mixture:

10 parts of the modified polyester as described in Example 5
120 parts of 1,2-dichloroethane.

The grinding is continued for 24 h. and 2.5 parts of a polymethylene polyphenyl isocyanate of the following structure are added:

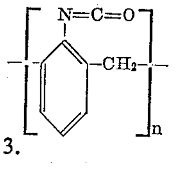

wherein $n$ averages 3.

After mixing for 2 h. the dispersion is applied to a flexible support of polyethylene terephthalate 35$\mu$ in thickness and dried for 2 min. at 80° C. The binder of the dried dispersion layer is soluble yet in 1,2-dichloroethane.

According to the kiss coating system 8 ccs. of a 2% solution of tin (IV) chloride in butanone are applied per sq. m. to the dried dispersion layer. After drying for 1 min. at 80° C., the magnetizable recording layer is found to be cured, insoluble, and resistant to wear.

We claim:

1. In a process of manufacturing magnetizable recording material comprised of a support carrying a recording layer of magnetically susceptible particles in a polymeric binder obtained by the reaction of a polymer containing reactive group selected from the group consisting of hydroxy and amido groups and a cross-linking agent for said polymer which is selected from the groups consisting of an aldehyde, an aldehyde-releasing compound, and a polyisocyanate, the improvement comprising the steps of:

(1) applying to said support a coating of a solvent solution of said polymer and said cross-linking agent, said solution containing said particles dispersed therein, (2) substantially evaporating the solvent from said coating, and (3) applying to the exterior surface of said coating a liquid containing a catalyst for catalyzing said reaction between said polymer and said cross-linking agent, whereby the cross-linking reaction takes place preferentially at said coating surface and produces a more durable surface stratum on said recording layer.

2. The process of claim 1 wherein said cross-linking agent is selected from the group consisting of an aldehyde and aldehyde-releasing compound and said catalyst is an acid catalyst.

3. The process of claim 1 wherein said catalyst is dissolved in a liquid which is a swelling agent for said polymer containing reactive groups.

4. Process according to claim 1, wherein the curable polymer is an elastomer prepared by partially modifying a polyester amide, by reaction with a polyisocyanate.

5. Process according to claim 1, wherein said polymer is a mixture of a polyester amide modified with a polyisocyanate and a copolymer of vinyl chloride, vinyl acetate and vinyl alcohol containing from 0.1% to 10% by weight of hydroxyl radicals, said polyester amide being present in a proportion of 2:8 to 8:2 to the vinyl polymer.

6. Process according to claim 1, wherein the cross-linking agent is a member selected from the group consisting of formaldehyde and a substance splitting off formaldehyde and the catalyst is an acid.

7. Process according to claim 1, wherein the reactive group containing polymer is used in an amount of 10 to 40% by weight of the magnetizable particles, and the cross-linking agent is used in an amount of 2 to 10% by weight of said polymer.

8. Process according to claim 1, wherein the cross-linking agent is a polyisocyanate and the catalyst a tertiary aliphatic amine.

9. Process according to claim 1, wherein the cross-linking agent is a polyisocyanate and the catalyst stannic chloride.

10. Process according to claim 1, wherein the catalyst is dissolved in an organic solvent in a proportion of 0.2 to 2% by weight in respect of the dry material in the recording layer.

11. The process of claim 1 wherein said catalyst is dissolved in a liquid which is a solvent for said polymer containing reactive groups.

12. The process of claim 3 wherein said liquid has a boiling point of at least about 60° C.

References Cited

UNITED STATES PATENTS

| | | | |
|---|---|---|---|
| 2,422,271 | 6/1947 | Vaala et al. | 260—42 |
| 2,424,883 | 7/1947 | Habgood et al. | 260—67 |
| 2,684,305 | 7/1954 | Quinlivan | 117—62.2 |
| 3,058,844 | 10/1962 | Johnson et al. | 117—132 |
| 3,083,118 | 3/1963 | Bridgeford | 117—47 |
| 3,104,983 | 9/1963 | Tarwater et al. | 117—93.31 |
| 3,149,995 | 9/1964 | Bauer | 117—66 |
| 3,216,846 | 11/1965 | Hendricx et al. | 117—62 |
| 3,240,619 | 3/1966 | Winchester | 117—38 |

FOREIGN PATENTS

| | | |
|---|---|---|
| 622,410 | 12/1962 | Belgium. |
| 698,689 | 11/1964 | Canada. |
| 705,853 | 3/1965 | Canada. |
| 847,347 | 12/1958 | Great Britain. |

OTHER REFERENCES

Britain, J. W., et al.: "Catalysis of the Isocyanate-Hydroxyl Reaction," J. Appl. Pol. Sci., vol. IV, No. 11, pp. 207–211 (1960).

WILLIAM D. MARTIN, *Primary Examiner.*

W. D. HERRICK, *Assistant Examiner.*